Patented Nov. 3, 1953

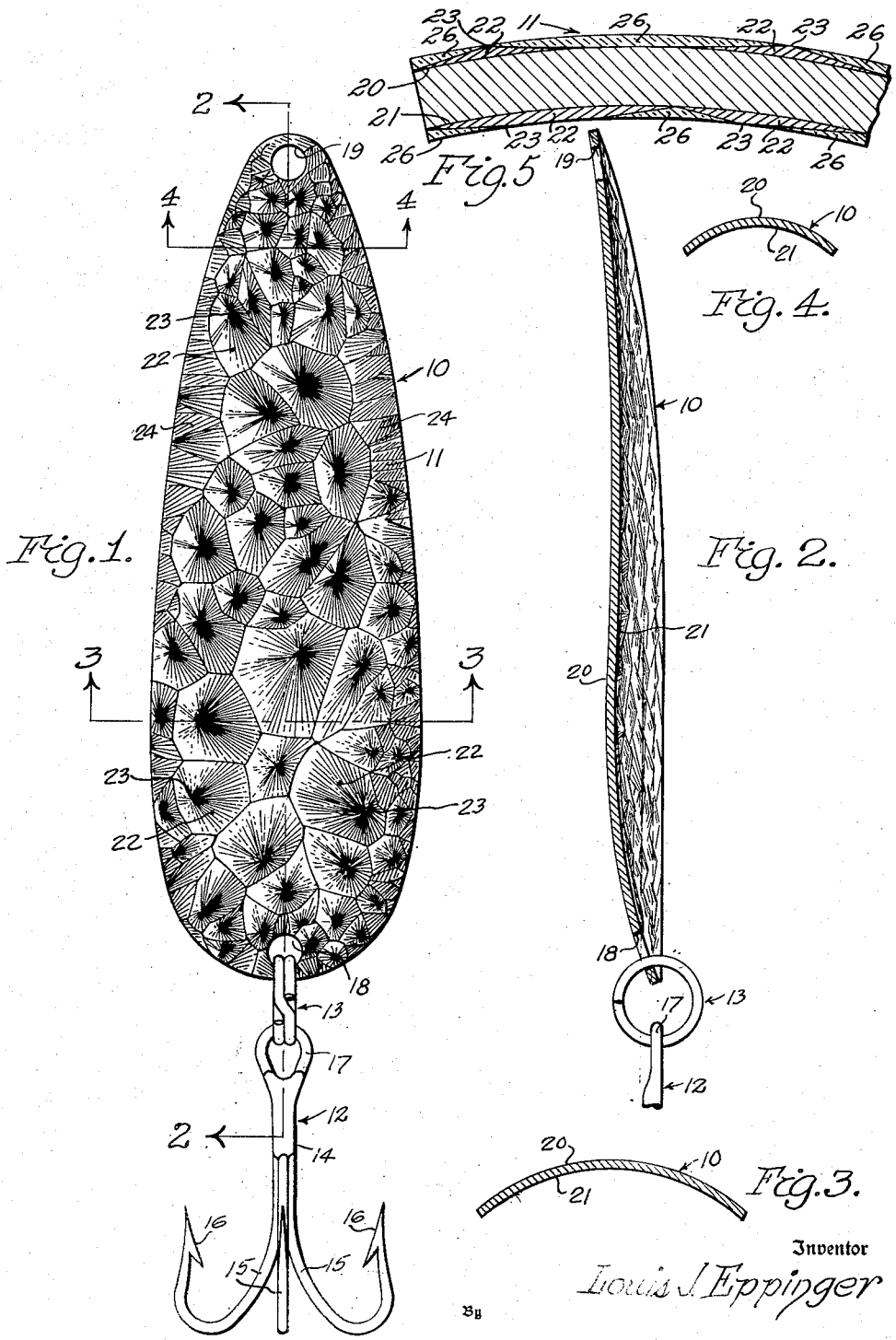

2,657,495

UNITED STATES PATENT OFFICE 2,657,495

FISH LURE

Louis John Eppinger, Detroit, Mich.

Application September 10, 1949, Serial No. 115,055

1 Claim. (Cl. 43—42.33)

This invention relates to fish lures and, in particular, to such lures having flashing or glittering objects associated therewith, such as spoons or spinners.

One object of this invention is to provide a fish lure having a glittering ornamented member such as a spoon or flasher associated therewith and of a novel type of construction which gives a variegated flashing appearance as it is drawn through the water.

Another object is to provide a fish lure of the foregoing character wherein the ornamentation of the glittering member consists of intersecting shallow approximately conical surfaces which are very broad in proportion to their height, these surfaces giving a unique light-reflecting effect in the water.

Another object is to provide a fish lure of the foregoing character wherein the relatively flat or shallow intersecting conical surfaces resemble the scales of a fish and therefore are of superior fish-attracting characteristics.

In the drawings:

Figure 1 is a top plan view of a fish lure according to one form of the invention;

Figure 2 is a longitudinal section through the fish lure taken along the line 2—2 in Figure 1;

Figure 3 is a cross-section taken along the line 3—3 in Figure 1;

Figure 4 is a cross-section taken along the line 4—4 in Figure 1; and

Figure 5 is a greatly magnified partial cross-section, taken along the line 3—3 near the left-hand edge of the flasher 11, with the proportions somewhat exaggerated for clearness of showing.

Referring to the drawings in detail, Figure 1 shows a fish lure, generally designated 10 and consisting generally of an ornamented fish-attracting member or flasher 11 constituting a central member or spoon coupled to a hook assembly 12 by a coupling device 13. The hook assembly 12 and coupling device 13 are of conventional type, the hook assembly 12 having a shank 14 with triple hooks 15 projecting therefrom and terminating in barbed points 16. The shank 14 at its opposite end terminates in an eye 17. The coupling device 13 passes through the eye 17 and also through a hole 18 in the member 11, and consists of a wire ring of two convolutions resembling the ordinary key ring. The ornamental fish-attracting member 11 is also provided at its opposite or forward end with a second hole 19 to which a conventional swivel (not shown) is preferably attached in order to prevent the line from twisting while the fish lure is drawn through the water.

The ornamented fish-attracting member or flasher 11 is made in any suitable shape, the so-called spoon shape shown being for the purposes of illustration. It is of concavo-convex shape, in that it has a generally convex outer surface 20 and a generally concave inner surface 21, both surfaces being of arcuate cross-section as shown in Figures 3 and 4. The member or spoon 11 is preferably of metal, and the surfaces 20 and 21 thereof are ornamented in a very striking way by being provided with approximately conical intersecting portions or protuberances 22 in the central portion thereof which are so shallow as to be almost flat and which terminate in points 23. The protuberances are solid geometrical figures having substantially polygonal bases and irregular conical characteristics, there thus being interspersed between the border representations 24 and the central portion solid geometric figures in some instances having shapes different from the other representations. The slide portions 24 at the edge of the spoon are optional and form representations of geometrical figures of various shapes, each figure having as one of its sides the edge of the spoon 11, certain of these figures resembling flutes of arcuate cross-section extending inward from the edge of the bases of the flat conical portions 22. The conical portions 22 of the member 11, however, predominate in the decorative effect and provide the major portion of the glittering appearance. Thus, the conical portions 22 in assembly resemble multiple flat conical facets which reflect the light in a unique manner. The conical portions 22 are not necessarily right circular cones, but, as shown, may be slanting cones with the elements or lines making up their sides varying in their inclination relatively to the altitude or base of the cone. The appearance, moreover, is generally similar, whether or not the conical portions 22 are formed on a flat surface, on a convex surface or on a concave surface.

The sizes of the conical portions or protuberances 22 on the ornamental member 11 can be varied widely from the tiny cones shown at the end adjacent the hole 18 to the large cones shown in the vicinity of the section line 3—3. The cones, however, are convex rather than concave and are thus not a "hammered" effect wherein the reflecting portions are concave. The conical portions 22 thus give optical effects resembling very flat convex conical mirrors. In the present application, the term "flat" or "shallow" is used to mean that the height of the cone is almost imperceptible in proportion to its breadth. The conical portions 22 are formed by a plating process, the details of which are outside the scope of the present invention, but which is disclosed and claimed in the Stareck Patent No. 2,313,456 of March 9, 1943 for "Method of Producing Decorated Coatings Exhibiting Patterns or Designs, and Product." The surfaces 20 and 21 are optionally coated with a transparent plastic coating 26 to protect the surfaces, and the light flashing upon the portions 22 and 24 not only glitters, when reflected, but also has traces of rainbow colors or iridescence. Rather than carrying the hook directly, the object 11 may be attached at one end to an elongated wire rod around which it spins, the line being attached to one end, preferably through a swivel, and the hook being attached to the other end.

In use, the fish lure 10 is operated the same as other fish lures in that it is drawn through the water in trolling or in casting. When the ornamented member 11 either rotates or wobbles to and fro, the glittering effect and hence the fish attracting effect is intensified. In actual use, the fish lure of the present invention has proved to be a splendid fish catcher and has been used in copper, brass and silver colors.

What I claim is:

A concavo-convex spoon for fishing comprising a central member of sheet material having on opposite sides thereof substantially smooth surfaces and deposited on the opposite surfaces thereof a coating of ornamental non-flaking material so dispersed over the surfaces that at the border thereof the coating effects representations of geometrical figures of various shapes and each figure having as one of its sides the edge of the sheet, the central portion of said surfaces having representations of solid geometric figures having substantially polygonal bases and irregular conical characteristics, there being interspersed between the border representations and the central portion solid geometric figures in some instances having shapes different from the other representations.

LOUIS JOHN EPPINGER.

References Cited in the file of this patent

UNITED STATES PATENTS

| Number | Name | Date |
| --- | --- | --- |
| 341,954 | Skinner | May 18, 1886 |
| 468,361 | Pflueger | Feb. 9, 1892 |
| 1,300,149 | Evans | Apr. 8, 1919 |
| 1,422,457 | McClanahan | July 11, 1922 |
| 1,463,858 | Wandve | Aug. 7, 1923 |
| 1,922,548 | Mattin | Aug. 15, 1933 |
| 2,028,948 | Pohlmann | Jan. 28, 1936 |
| 2,241,941 | Bates | May 13, 1941 |
| 2,313,456 | Stareck | Mar. 9, 1943 |